United States Patent
Chakraborty et al.

(10) Patent No.: US 10,261,753 B2
(45) Date of Patent: Apr. 16, 2019

(54) GRAPHICAL USER INTERFACE LANGUAGE MODEL

(71) Applicant: Bank of America Corporation, Charlotte, NC (US)

(72) Inventors: Pinak Chakraborty, Hyderabad (IN); Anupreet K. Lamba, Haryana (IN)

(73) Assignee: Bank of America Corporation, Charlotte, NC (US)

( * ) Notice: Subject to any disclaimer, the term of this patent is extended or adjusted under 35 U.S.C. 154(b) by 157 days.

(21) Appl. No.: 15/596,187

(22) Filed: May 16, 2017

(65) Prior Publication Data
US 2018/0336006 A1 Nov. 22, 2018

(51) Int. Cl.
| G06F 3/0482 | (2013.01) |
| G06F 3/16 | (2006.01) |
| G06F 3/0484 | (2013.01) |
| G09B 21/00 | (2006.01) |
| G10L 13/027 | (2013.01) |

(52) U.S. Cl.
CPC ............ *G06F 3/167* (2013.01); *G06F 3/0482* (2013.01); *G06F 3/04847* (2013.01); *G09B 21/005* (2013.01); *G09B 21/008* (2013.01); *G10L 13/027* (2013.01)

(58) Field of Classification Search
CPC ..... G06F 3/167; G06F 3/0482; G09B 21/008; G09B 21/006
See application file for complete search history.

(56) References Cited

U.S. PATENT DOCUMENTS

| 6,046,722 | A | 4/2000 | McKiel, Jr. | |
| 8,862,985 | B2 | 10/2014 | Gallo et al. | |
| 8,996,376 | B2 | 3/2015 | Fleizach et al. | |
| 2004/0218451 | A1* | 11/2004 | Said | G06F 3/0481 365/222 |
| 2011/0099498 | A1* | 4/2011 | Barkol | G06F 9/451 715/771 |

OTHER PUBLICATIONS

Xun Yuan, GUI Interaction Testing:Incorporating Event Context,Jul./Aug. 2011, vol. 37 ,p. 559-574 (Year: 2011).*
"Window-Eyes", Wikimedia Foundation, Inc., Apr. 12, 2016.
"JAWS (screen reader)", Wikimedia Foundation, Inc., Apr. 11, 2017.

* cited by examiner

*Primary Examiner* — Matthew Ell
*Assistant Examiner* — Zelalem W Shalu
(74) *Attorney, Agent, or Firm* — Weiss & Arons LLP; Michael A. Springs, Esq.

(57) ABSTRACT

Method and apparatus for allowing visually impaired users to easily interact with GUI applications is provided. The method and apparatus may utilize a directed graph of the GUI and a language model to describe the GUI in a brief but concise and descriptive manner.

10 Claims, 3 Drawing Sheets

GRAPHICAL USER INTERFACE LANGUAGE MODEL

FIELD OF TECHNOLOGY

This disclosure relates to audio input-output devices for computer systems. More specifically, this disclosure pertains to the use of a unique language model to format audio input or output.

BACKGROUND OF THE INVENTION

It has long been a desire of the computer industry to provide a computer system which facilitates productive access to putative users who are visually impaired. This desire has been frustrated by the fact that the predominant output medium for computer systems are typically visual in nature, such as display screens or printouts. These visual outputs are especially difficult for the visually impaired to utilize. While some attempts have been made to create audio analogues of the standard visual outputs, they remain limited in terms of ease of use and efficiency.

Furthermore, the difficulties innate to creating audio output analogs has been compounded by the near universal adoption of graphical user interfaces (GUI) as an output standard. GUIs are used to explicitly attempt to recreate a computer using experience which mirrors the form and manner with which objects visually appear in real life. This has the unfortunate effect of increasing the magnitude of visually impaired sensory deficiency. As a result, there is clear utility in and benefit from, novel methods and apparatuses for improving the audio output of computers.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

For the purposes of this disclosure, like reference numerals in the figures shall refer to like features unless otherwise indicated. The drawings are only an exemplification of the principles of the invention and are not intended to limit the invention to the particular embodiments illustrated.

BRIEF SUMMARY

To satisfy the long-felt but unsolved needs identified above, at least one embodiment is directed toward an apparatus and a method for interfacing with a computer system.

The method may comprise converting a directed graph representation of a Graphical User Interface (GUI) operating on a computer system into a formatted text string. The text string may be parsed using a user appropriate language model. An audio format of the parsed text string may then be output.

The method may comprise activating a computer program displaying a GUI with a primed object, preparing a directed graph representation of the GUI, parsing at least one string to contain words describing the primed object, and generating a text-to-voice formatted audio signal corresponding to a sequential expression of each parsed string.

The computer program may display the GUI on a monitor. The GUI may comprise a plurality of objects. One of the plurality of objects, the primed object, may be an object primed to receive input.

The directed graph representation may define a data structure including a node associated with each of the plurality of objects, an action verb associated with each node, an action object associated with each action verb, a transition associated with each action verb, and a consequence associated with each action verb.

The number of parsed strings may be equal to a number of action verbs associated with the one of the nodes associated with the primed object.

The parsing of each string may comprise concatenating and conjugating data from the directed graph representation into a string. The concatenation and conjugation may be according to an order and rules of a human language grammar. The data may comprise the node associated with the primed object, the action verbs associated with the node associated with the primed object, and each of the action object, transition, and consequence associated with the action verbs.

Each string may comprise a unique action verb.

Each action verb may comprise words of a human language description of an activity which may be performed by the corresponding primed object according to execution code logic of the computer program.

Each action object may comprise words of a human language description of a user input activity for the primed object addressed by the execution code logic.

Each consequence may comprise words of a human language description of a generated result in response to executing the action verb.

Each transition may comprise words of a human language description of an object or GUI primed in response to executing the action verb.

The parsing may further comprise inserting text into the string which enhances the audio signal's simulation of human conversation.

The user input activity may include striking keys on a keyboard.

The method may further comprise receiving an input from a user in response to the generated audio signal. In response to the receipt of the user input, the human language of the generated audio signal may change.

The method may further comprise receiving from a user, via a microphone, an idiosyncratic expression in response to the generated audio signal, associating the idiosyncratic expression with an action verb, and executing the generated result associated with the action verb. The idiosyncratic expression may define a response which is different from the action verbs and action objects explicitly listed in the directed graph but which is human understandable to correspond to with an action verb or action object explicitly listed in the directed graph. The microphone may transmit the expression to speech-to-text software. The speech-to-text software may convert the expression into a data format which can be processed by the execution code logic.

The GUI may comprise at least one object selected from the group consisting of checkboxes, radio buttons, drop down lists, combo boxes, list boxes, tree views, hotkeys, toggles, text fields, vertical slider bars, horizontal slider bars, progress bars, menu bars, tab sequences, group boxes and any combination thereof.

The directed graph representation of the GUI may be prepared prior to activating the computer program.

The data structure may be selected from the group consisting of list, array, associative array, multimap, set, bag, multiset, stack, queue, double ended queue, priority queue, tree, graph, and any combination thereof.

The audio signal may comprise a sound attribute selected from the group consisting of alternating tone, alternating tempo, musical notes, pauses between words, sound effects, and words absent from all of the nodes, action verbs, action objects, transitions and consequences.

The apparatus may comprise a computer system constructed and arranged to receive audio input via a microphone and to output audio messages via a speaker. The computer system may comprise hardware and software constructed and arranged to: convert a directed graph representation of a Graphical User Interface (GUI) operating on the computer system into a formatted text string; parse the text string into a user appropriate language model; and output an audio format of the parsed text string.

The GUI may be positioned on a webpage.

The GUI may comprise at least one object selected from the group consisting of checkboxes, radio buttons, drop down lists, combo boxes, list boxes, tree views, hotkeys, toggles, text fields, vertical slider bars, horizontal slider bars, progress bars, menu bars, tab sequences, and group boxes.

The apparatus may further comprise a user input device. The user input device may be selected from the group consisting of keyboard, touch screen, stylus, light pen, mouse, data uplink, microphone, joystick, punch-card, flash card, cartridge, audio input, motion sensor, sign language reader, laser sensor, optical sensor, and any combination thereof.

The apparatus may further comprising an output device. The output device may be selected from the group consisting of printouts, 3D imagery, holographic display, and video display, and any combination thereof.

The directed graph representation of the GUI may comprise data array items including nodes, transitions, and actions associated with elements of the GUI. The conversion into the text string may include listing data array items associated with elements of the GUI.

The actions may comprise action verbs and objects upon which the action verbs may be applied.

The objects may include elements of the GUI.

DETAILED DESCRIPTION OF THE INVENTION

"Computer System" means any logic using device used to receive user input and process, store, transmit, and/or output data, and includes but is not limited to, personal computers, business computers, laptop computers, tablet devices, computer networks, software applications, web browsers, SMS devices, SMS software, email devices, email software, electronic data devices, cell phones, cell phone applications, firmware, websites, cloud-based processing, internet routers, web servers, computer terminals, PDAs, any component thereof, any device integrated with any of the aforementioned, and any combination thereof.

"Display" means the output of a computer system's user-interface, which is constructed and arranged to be detected by at least one of a user's senses, it includes but is not limited to tactile, visual and/or audio output.

The invention may include a computer system comprising a media output device constructed and arranged to display a GUI object as an expression of a directed language.

Organizations supporting software often strive to make their software as accessible and user friendly for their users as possible. This goal is often frustrated in the context of impaired software users. The near ubiquity of GUI objects in software has exacerbated this problem.

Prior to the use of GUIs, user-computer interfaces were predominantly text based, such as for example command line interfaces (CLI), and could be effectively emulated with the use of text-to speech software such as Windows EYES (by Microsoft Corp.) or JAWS (by Freedom Scientific Inc.) Today, the innate nature of GUIs however greatly frustrates the effectiveness of text-to speech software for impaired users.

GUIs were designed to combine the operation of a computer system with the use of sensory cues, most notably the direct manipulation of graphical objects. This allows GUI items to emulate imagery and activity present in daily life. Such representations make the computer using experience intuitive, remove any prerequisite need to understand technical commands or programming languages, and therefore lends itself towards much greater usability.

However, the GUI's reliance on visual cues makes converting GUIs into text-to-speech output using conventional methods a cumbersome and suboptimal solution for visually impaired users. The difficulty in converting a GUI into text-to-speech output using conventional methods is based, at least in part, on a GUI's usage of GUI objects.

Well known examples of GUI objects include but are not limited to, checkboxes, radio buttons, drop down lists, combo boxes, list boxes, tree views, hotkeys, toggles, text fields, slider bars (vertical and horizontal), progress bars, menu bars, tab sequences, and group boxes. Key benefits of such objects are that they can be accessed in any order, selection of an object can immediately be changed, and the objects can be easily arranged and re-arranged according to a wide variety of permutations, all tailored to the individual needs or tastes of the user.

The various benefits of GUI objects however result in many problems when using text-to-speech software to describe the interface to an impaired user. When GUI visual displays rapidly change, as they typically do, literal text to speech software requires voluminous amounts of verbiage to express even minor screen tweaks. This is both time consuming and monotonous, making it likely that the user will become distracted and miss some of the display speech. Furthermore, GUI navigation often results in objects sliding off the screen or underneath other objects, requiring complex word structures to express the objects' respective orientation. Besides for drastically increasing the time needed to perform a given activity, this also makes practical navigation between objects difficult.

The invention solves this problem by presenting a description of the GUI in a concise language format describing one or more navigational cues instead of attempting to describe, with words or sounds, the complex visual objects of the GUI. This can be appreciated by comparison to a prior art attempt to address this matter.

Figure 1:
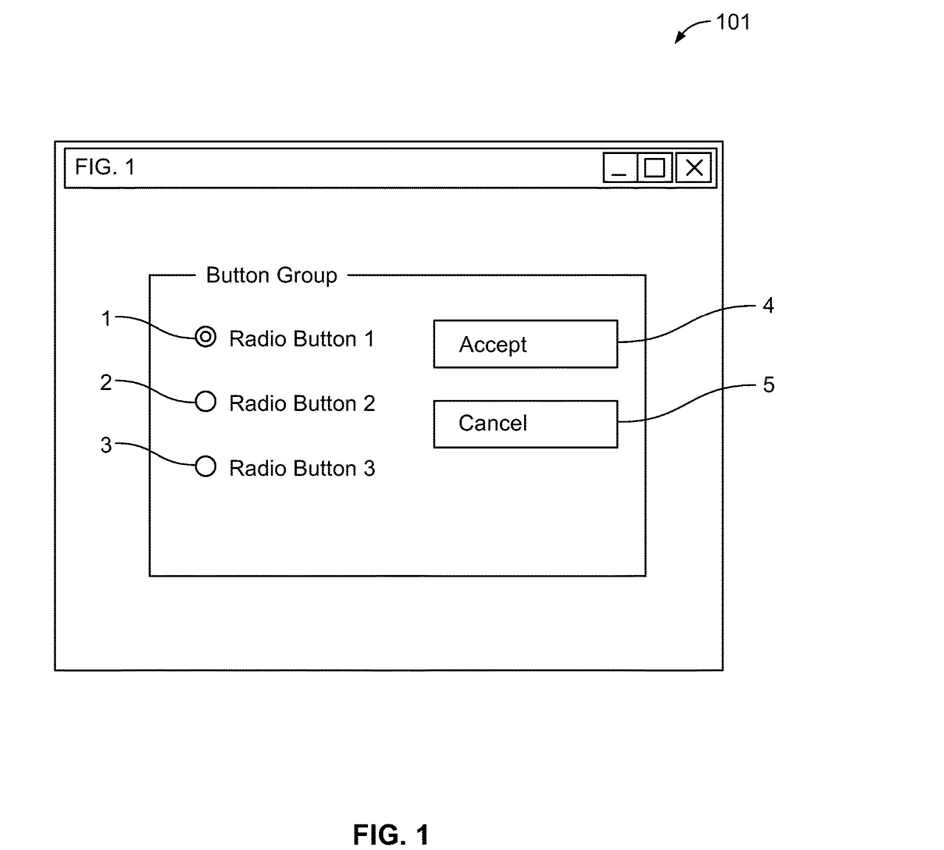
FIG. 1 illustrates a GUI useful with the invention.

U.S. Pat. No. 6,046,722 describes changing the pitch of an ambient background sound as a mouse pointer traverses a screen. This process requires the use of a largely unintelligibly complex text based description to describe the underlying GUI that the mouse pointer is traversing. For example, if a user slid their mouse onto the GUI illustrated in FIG. 1, the audio output could be:

"Window FIG. 1, Title: FIG. 1, Top Left Corner Left: Minimize, Top Left Corner Center: Full Screen, Top Left Corner Right: Exit, Center Left Side Top: Radio Button 1, Center Left Side Middle: Radio Button 2, Center Left Side Bottom: Radio Button 3, Center Right Top: Accept Button, Center Right Bottom: Cancel Button"

In the case of the FIG. 1 GUI, the GUI is quite simple yet requires a large amount of detailed text. For more complex GUI objects, the text required according to this method is onerously long and quite difficult to follow.

In contrast, because the invention reduces the description of the GUI into a simple array of navigational cues, instead of describing the GUI objects in detail, the operational capability of the GUI can be fully described with only a few simple easy to follow words.

In at least one embodiment, the speech display is not merely a rote description of the respective locations and functions of the GUI objects on the screen, but instead comprises expressions of a specific language model syntax decoding a directed graph representation of the present GUI objects.

In a directed graph representation of a GUI, the GUI is represented in the form of its constituent objects, how to navigate between them, and what each object can do. In a language model syntax, simple consistent formal rules are used to assemble words describing what the GUI objects are, what they do, and how to move between them. The directed graph may be prepared prior to or simultaneous to computer use. For example directed graph may be present in software or an application that must be installed prior to using the desired GUI using program. Alternatively, the directed graph may be populated by pulling information from the GUI, the GUI using program, from system calls between the GUI using program and the operating system, any combination thereof, and the like.

In communications and information processing, decoding refers to the implementation of formal rules to convert stored information into a representative communication expression. By using a formal directed graph representation of a GUI object and expressing them using formal rules, i.e. a predictable and formal language model, the audio cues for representing the GUI object can be both concise and informative. This helps provide the visually impaired user many of the same benefits that seeing a GUI object affords a non-visually impaired user.

In at least one embodiment, in the directed graph representation each GUI object is modeled as one or more nodes. One or more possible actions may be associated with each node. Each node is an element of the GUI present on the screen. Each action reflects a specific operation that can be taken by a user at the node, and where appropriate, causes a transition to a subsequent node that comes into focus if a given action is taken.

The directed graph may be constructed out of any possible data structure including but not limited to a list, array, associative array, multimap, set, bag, multiset, stack, queue, double ended queue, priority queue, tree, graph, and any combination thereof. The dataset for the directed graph may include series of nodes and at least one action per node. Each action may comprise a verb, an object of the verb, and a consequence of performing the verb on the action. Each action may also comprise a transition node. By decoding the nodes, actions, and transitions in the directed graph according to the formal language, a brief assemblage of words can be put together which clearly and concisely describes the functionality of the GUI.

For example, FIG. 1 shows illustrative GUI 101 for a user to select from a choice of three values to populate a data field. The GUI may contain such objects as a list of 3 radio buttons 1, 2, 3, ACCEPT button 4, and CANCEL button 5. When loaded, the GUI 101 may display the first radio button (1) as the pre-selected focus. By "focus" what is meant is that at least one particular object of the GUI, (such as a specific button 1, 2, 3, 4, 5) has been placed into an active state and is primed to have its actions and consequences executed. Other GUI objects which are not in focus are not so primed.

An illustrative directed graph representation of GUI 101 may include 5 nodes, one for each GUI object. Possible actions for each of the radio buttons may include select (to indicate a choice which will populate the data field if ACCEPT occurs), forward (to toggle forward to another possible selection), and backwards (to toggle backwards to another possible selection). User selection of Select would indicate that ACCEPT is a transition node and should come into focus after the action is executed. Forward or backwards would indicate sequential toggling of focus between the respective radio buttons 1, 2, 3 or the CANCEL button 5. Similarly, user selection of the ACCEPT button's 4 possible actions would be forward, backwards, or execute. Forward or backwards may indicate sequential toggling of the focus towards the other nodes while user selection of execute would lead to the focus shifting to a new node of a different GUI object reflective of the user's selection.

Table 1 illustrates one possible directed graph representation of GUI 101 illustrated in FIG. 1.

TABLE 1

| Node | Action Verb | Action Object | Transition To Node | Consequence |
| --- | --- | --- | --- | --- |
| Button 1 | Forward | ▶Key | Button 2 | Change Focus |
| Button 1 | Backward | ◀Key | Button 3 | Change Focus |
| Button 1 | Mark | Enter Key | Accept | Populate Data Field with Choice 1 |
| Button 2 | Forward | ▶Key | Button 3 | Change Focus |
| Button 2 | Backward | ◀Key | Button 1 | Change Focus |
| Button 2 | Mark | Enter Key | Accept | Populate Data Field with Choice 2 |
| Button 3 | Forward | ▶Key | Cancel | Change Focus |
| Button 3 | Backward | ◀Key | Button 2 | Change Focus |
| Button 3 | Mark | Enter Key | Accept | Populate Data Field with Choice 3 |
| Accept | Forward | ▶Key | Cancel | Change Focus |
| Accept | Backward | ◀Key | Cancel | Change Focus |
| Accept | Mark | Enter Key | Different GUI | Save Data Field Choice |
| Cancel | Forward | ▶Key | Button 1 | Change Focus |
| Cancel | Backward | ◀Key | Button 3 | Change Focus |
| Cancel | Mark | Enter Key | Different GUI | Make no change to data field |

While Table 1 shows an exemplary directed graph representation of GUI 101 the above table represents this concept using 5 associated data fields (Node, Action Verb, Action Object, Transition to Node, and Consequence), more or fewer associations are also encompassed by the inventive concept. This includes but is not limited to associating each action verb with more than one action objects, associating each action object with more than one action verb so that more than one consequence may occur (for example if some consequences are contingent on particular values of selected data), is and representing action verbs and action objects by a single item encompassing both an action verb and an action object of that verb. In addition, Table 1 shows that each node is associated with a plurality of unique action verbs, each of which define one of the various possible choices a user may make. In this case, each node is associated with three unique action verbs. The inventive concept also encompasses alternative directed graph representations, for example ones in which instead each action verb is associated with a unique node.

In at least one embodiment, some or all of the GUI objects of one or more GUIs included in program(s), piece(s) of software, application(s), or operating system(s) (collectively "targeted program"), are mapped as a directed graph of nodes and all of each node's potential actions. The mapping may occur prior to or simultaneous with a user activating the targeted program. The mapping may be performed manually, by for example, entering data based on the targeted program's specifications or other documentation. In addition to or in the place of manual mapping, the mapping may be performed automatically, by for example, collecting data from the targeted program's source code, object code, executable code, from system calls between the targeted program and the operating system, screen scraping (extracting data from human-readable output coming from the targeted program), and/or any other data source which provides some or all the data needed to populate any or all of the fields in the directed graph.

When a targeted program is activated, a display program, such as a text to speech program, may access the directed graph for the elements of that targeted program's GUIs. The user interface may utilize the directed graph to navigate the GUIs of the targeted program. As a result, the system may either be an overlay of an existing GUI operation or may substitute some or all of the software's functions.

In at least one embodiment the directed graph may be used to construct a language model to clearly and concisely express both the display GUI content as well as the input of user information. The model language may use the node and action syntax of the directed graph to assemble word strings efficiently describing how to navigate and operate the nodes present in a GUI displaying environment. The parsing of the words within the string may include, a statement of the node currently in focus, conjugation of that node with its associated action verbs and action objects, a recitation of the consequences of executing the node, and an indication of, after execution, which node will transition into focus. Because the language model decodes the specific properties of the GUI with consistent terminology, it can utilize user-friendly shorthand notation without sacrificing precision or clarity.

In at least one embodiment, the language decodes the directed graph of an object and produces an audio or tactile display according to specific formal syntax. The syntax will comprise a conjugation of the action verb, action object, and transition node according to the formal rules of a language known to the user (for example English, Spanish, French, Russian, etc.).

In at least one embodiment the object of the verb may be one or more keyboard strokes, mouse clicks, mechanical or electrical activities, and/or verbal statements or sounds generated by or because of the user. For example, the DOWN, FORWARD, TAB, or other keys may all represent objects for the verb press or activate. In at least one embodiment the verbs and objects are specific hotkey strokes known in the art and/or individually created by a user.

Certain objects of the verb may exist as defaults which may always be present and available for use. For example, EXIT, MINIMIZE, or TOGGLE TO ANOTHER OBJECT may always exist. These defaults may allow an experienced user to access these verbs without needing to wait for an audio cue indicating their presence.

For example, upon loading the GUI of FIG. 1, when within the pre-selected node of choice 1, an English language version may output the text string:

"Forward to Choice 2 Back to Choice 3 Enter to Select Choice 1."

This text string may be formed by identifying the node of the object currently in focus, then reciting a concatenated and linguistically conjugated assembly of some or of all the data fields associated with that node. In this case, the action verbs and transition nodes associated with the node in focus were used to make up the assembly. The string may also include an assembly of fewer or of more of the data fields associated with the node in focus. The specific details of which, and how many, of the data fields to include in each assembly may vary depending on factors including, but not limited to, the case by case specifics of the data field constituents of the directed graph, how unique or ubiquitous the object or GUI is, how suitable a detailed or brief description is for a given user or object, and how to best describe the nature and operation of the GUI at issue.

This approach to describing a GUI object results in a recital which is far more concise and user friendly than the verbose and cumbersome paragraph the previously described prior art method produces. Such concise language allows the user to efficiently navigate the logic of the GUI without needing to hear relative positional information of no value to the user. In effect, the intuitive visual experience of a GUI is replaced by the intuitive audio and relational experience of human conversation.

By parsing and assembling text from a decoded directed graph, a number of efficiencies and benefits may be achieved.

In at least one embodiment, additional syntax, which increases user engagement or which enhances the audio signal's simulation of human conversation, may be inserted within any positions within the text string. This can be accomplished by supplementing a rote text recitation of directed graph data with additional words or sounds. These additional words or sounds, may stimulate emotions or simulate human speech through activation of the particular circuits typically used by the brain to process these sorts of words or sounds. This activation may enhance user engagement and may better simulate human speech.

For example, the word "OK" recited with a different octave and/or tempo may be inserted at the beginning of the string to prime a user's attention. Alternating the tone, tempo, or other audio properties of different subsets of the string can further transition the output into a more human friendly format. Strategic placement of musical notes, pauses, or other sound effects may also support this effect. In addition, unnecessary language not needed to explain the node properties may also be added to make the experience more conversational.

In at least one embodiment, the output may be in English and/or a non-English language or may be selected from multiple languages. Because the output text is parsed from information within a directed graph, so long as the basic decoding rules of any language's conjugation of nouns and verbs are known, the system can parse string sentences in that language. As a result, non-English using visually impaired users may gain easy access to the system. For example, by using simple parsed conjugated sentences, machine translation software can convert parsed strings into foreign languages.

In at least one embodiment, a user may input an instruction (such as a specific power word or audio cue) to change the output language in mid-use. Relatedly, the system may be configured to receive input in multiple languages and to output information in one or more languages. This may involve simultaneous translations, responding in the language most recently input, or any other possible permutation of this principle.

Figure 2:
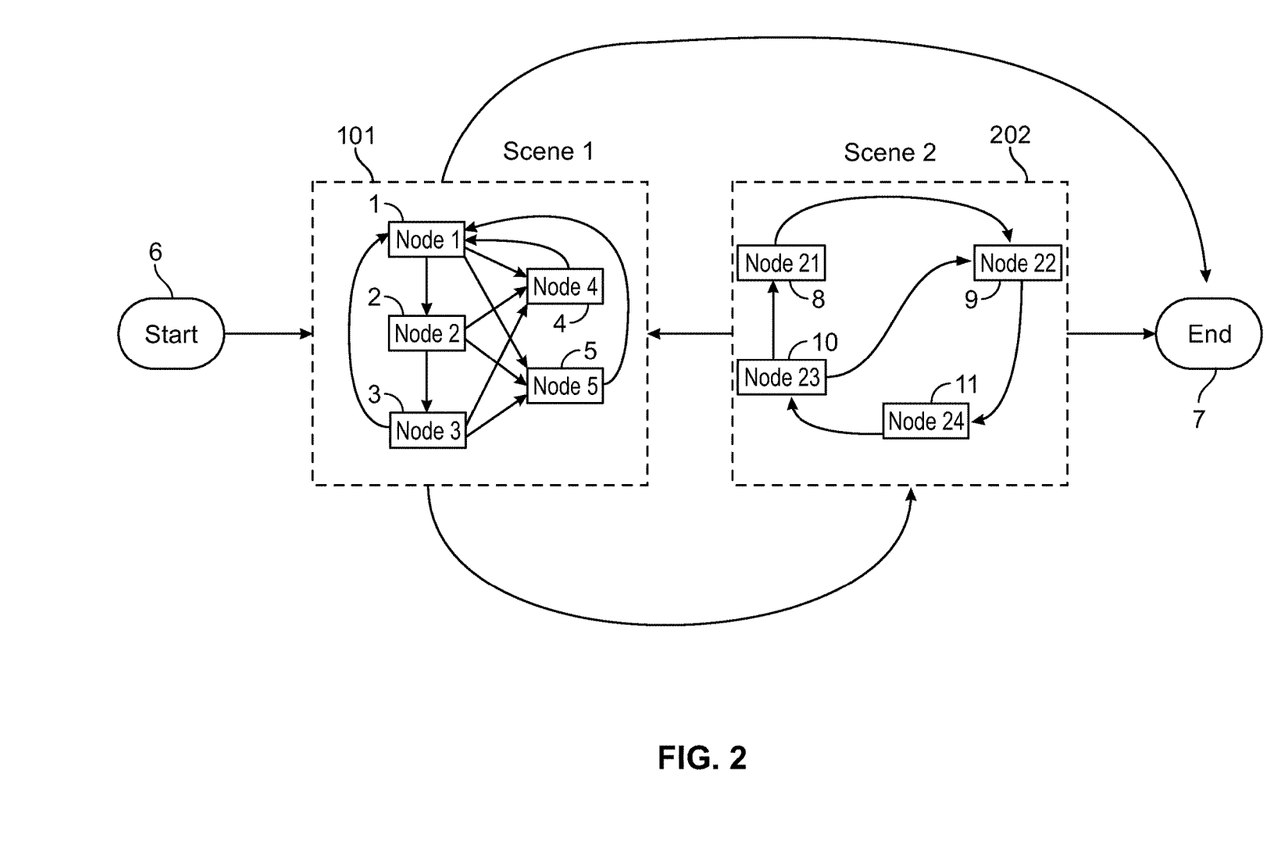
FIG. 2 illustrates a sequential representation of language model GUI navigation.

FIG. 2 illustrates how using the system changes the primary conceptual experience of computer use from a visually based framework to a relationally based framework. Here GUI 101 illustrated in FIG. 1 is described in the form of several nodes three radio buttons 1, 2, 3, the accept button 4 and the cancel button 5. Some or all of Scene 1 is described when the user starts 6 a GUI 101 using program and the specific pre-selected GUI object is in focus 1. The output also describes the specific actions or action verbs available while at this node. The output may also describe some or all other actions/action verbs available at other nodes 2, 3, 4, 5.

If the user navigates towards, and then activates, cancel node 5, the program ends 7. If the user makes a selection 1,2 3, then navigates towards and activates accept button 4, new GUI (102) may appear. New GUI 102 may make use of the data field selection. This may set a new scene (Scene 2) where new GUI 102 will have its own respective nodes 8, 9, 10, 11, relational actions and transitions, etc. Every possible permutation of the software may be stored in the directed graph. As a result, a user may visualize the various GUIs (e.g. GUI 101 and GUI 102) of a targeted program, not as a difficult to imagine visual object but, as an easy to comprehend arrangement of navigational cues.

Because this experience continually expresses navigational cues instead of visual ones, the user's actual mental experience is enhanced. Instead of trying to poorly emulate a visual environment, the user may create in his mind a serious of relationships and associations which the human brain is pre-wired to do. Many of the same brain functions that people use for social interactions and relationships are tapped into by a computer user using this system. As a result, human user engagement is even further enhanced and the likelihood of a user losing focus or their attention to the output is reduced.

User input may be accomplished via keyboard, touch screen, stylus, light pen, mouse, data uplink, microphone, joystick, punch-card, flash card, cartridge, audio input, motion sensor, sign language reader, laser sensor, optical sensor, any other device or method known in the art, and any combination thereof.

System output may be accomplished via speakers, printouts, 3D imagery, holographic display, and video display, and may be in textual, audio, visual, graphical and/or audiovisual format, and any combination thereof.

In at least one embodiment when a user operates an input device, the system may output a language model text strings indicating the current node's possible actions.

In at least one embodiment, as a user operates an input device, the system may output a repeating loop of language model text strings until a selection is made or another controlling event occurs (such as a time or other limit elapsing). Such looping may assure that a user will not get lost if an output was misheard or was otherwise garbled, drowned out or missed.

In at least one embodiment, the input may be audio, and in some embodiments, formatted according to the language model. This has the benefit of training/reinforcing the attention-grabbing activity innate to the system.

Figure 3:
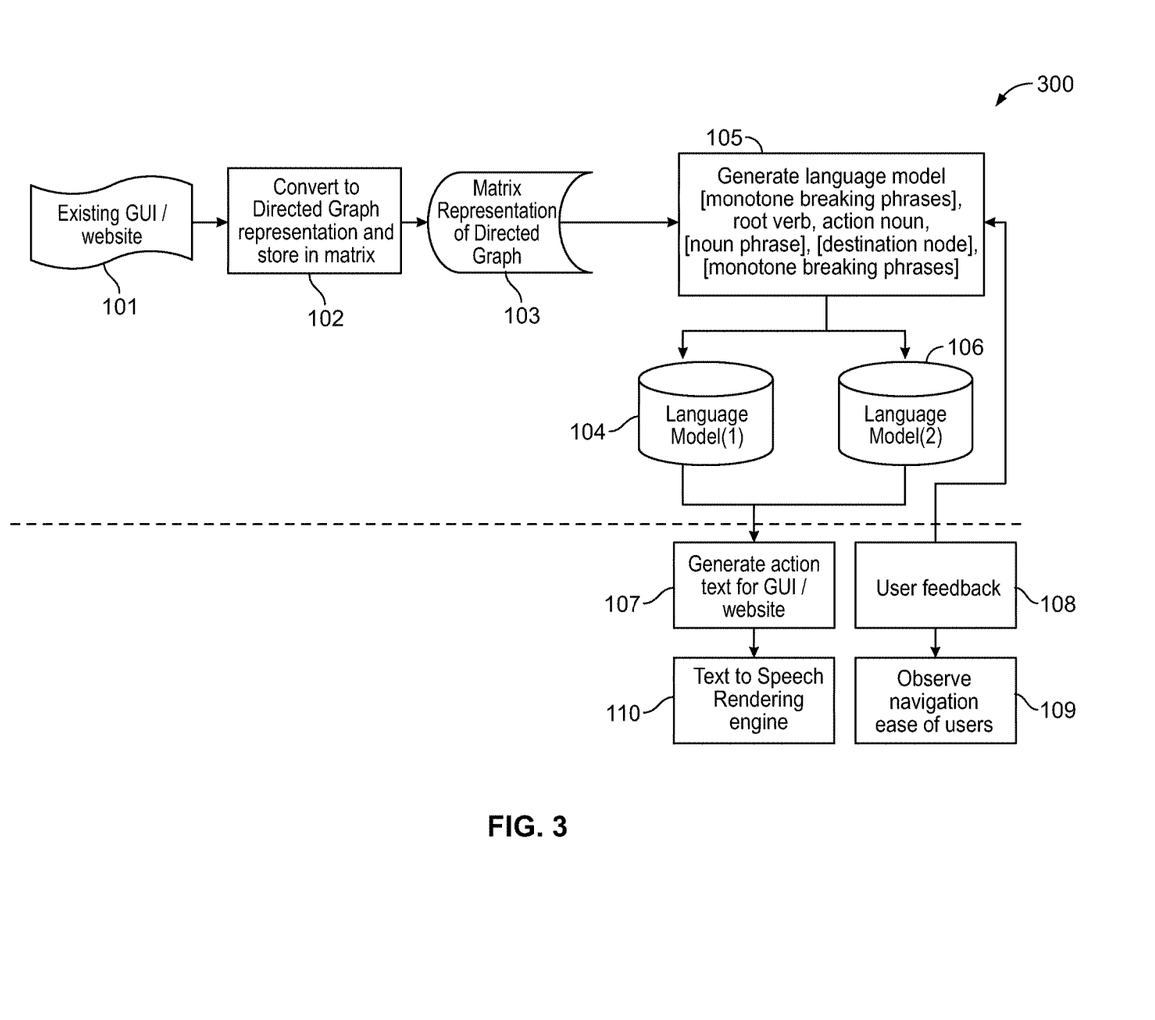
FIG. 3 illustrates a flow chart representation of an embodiment of the invention.

FIG. 3 shows an illustrative flow chart for describing a possible framework for the system 300 making use of a targeted program using GUI 101. A matrix 103 comprising the directed graph 102 (including the nodes and its associated verbs, objects, and transitions inherent to the targeted program) may be prepared. Matrix 103, may be RAM or ROM data accessible to a program implementing system 300. At least one specific language model 104 is available to decode the matrix 103 and present it as a grammatically comprehensible language model output 105, parsing text strings to effectively communicate associated verbs, objects, and transitions of a selected node.

When a user activates GUI 101 using a targeted program, the system 300 may decode the various actions, action verbs, action objects, nodes, and transitions included in matrix of the directed graph 103 and output them as a word string according to the language model output 105.

Because directed graph matrix 103 is a data matrix, generated language model output 105 may differ if a different language model 106 is used to decode matrix 103. What results, may be output 107 such as a formatted text string, that comprises a navigational representation of GUI 101, which is finally expressed in an output accessible by the user 107 such as audio text to speech rendering 110. User input 108 prompts system 300 to shift towards the consequence of the selected action on the selected node and appropriately repeat the process.

In at least one embodiment, the text strings may be simultaneously output, or only output, onto visual media such as a monitor or printout. This may allow for a non-visually impaired, or an audio-impaired user to simultaneously interact with the system alongside a visually impaired user.

In at least one embodiment, system 300 further includes a heuristic for building and improving language model 109, i.e. it learns from its users how to better interact with the users. As a non-limiting example, an algorithm may note certain human actions (phrases, shorthand, changes in voice timbre, volume, pitch, velocity, or word order) associated with various combinations of nodes and verbs and may use those briefer cues as instructions to execute those actions. In the alternative, users may self-input their own verbal "hot key" type shortcut expressions.

In at least one embodiment, system 300 may be in electronic communication with a network of other users storing common practices of users. Upon determining that a specific verbal hot key is commonly used by more than a threshold population of users, the system may prompt additional users to use the verbal hot key or may simply respond to it when uttered by a user.

The system described herein may be used with any known computer system. The computer system may have a processor for controlling the operation of associated components, and may include RAM, ROM, input/output modules and a memory. The processor may also execute all software running on the computer—e.g., the operating system. Other components commonly used for computers such as EEPROM or Flash memory or any other suitable components may also be part of the computer system.

The memory of the computer system may be comprised of any suitable permanent storage technology—e.g., a hard drive or cloud based storage. The memory stores software, including the operating system of any application(s), along with any data needed for the operation of the computer system. Alternatively, some or all of computer executable instructions may be embodied in hardware or firmware. The computer executes the instructions embodied by the software to perform various functions.

The system may be connected to other computer systems via a local area network (LAN), a wide area network (WAN), or other network arrangement. The system may operate in a networked environment supporting connections to one or more remote computers, such as terminals, personal computers, or servers that include many or all of the elements described above relative to system. The network may be interconnected via adaptors, modems, or other communication medium including the internet.

It will be appreciated that any known network connections or other means of establishing a communications link between the computers may be used. The existence of any of various well-known protocols such as TCP/IP, Ethernet, FTP, HTTP and the like is presumed, and the system can be operated in a client-server configuration to permit a user to retrieve applications such as web pages from a web-based server. Any of various conventional web browsers can be used to display and manipulate data on web pages.

The computer system may also include one or more of the following components: I/O circuitry, which may include a transmitter device and a receiver device and may interface with fiber optic cable, coaxial cable, telephone lines, wireless devices, PHY layer hardware, a keypad/display control device or any other suitable encoded media or devices; peripheral devices, which may include counter timers, real-time timers, power-on reset generators or any other suitable peripheral devices; logical processing device, which may compute data structural information, structural parameters of the directed graph and/or language model and machine-readable memory. Components of the computer system may be coupled together by a system bus or other interconnections and may be present on one or more circuit boards. In some embodiments, the components may be integrated into a single chip. The chip may be silicon-based.

While this invention may be embodied in many different forms, there are described in detail herein specific preferred embodiments of the invention. The present disclosure is an exemplification of the principles of the invention and is not intended to limit the invention to the particular embodiments illustrated. All patents mentioned herein or mentioned, are incorporated by reference in their entirety. Furthermore, the invention encompasses any possible combination of some or all of the various embodiments described herein and/or incorporated herein. In addition, the invention encompasses any possible combination that also specifically excludes any one or some of the various embodiments described herein and/or incorporated herein.

The above disclosure is intended to be illustrative and not exhaustive. This description will suggest, many variations and alternatives to one of ordinary skill in this art. All the alternatives and variations are intended to be included within the scope of the claims where the term "comprising" means "including, but not limited to". Those familiar with the art may recognize other equivalents to the specific embodiments described herein which equivalents are also intended to be encompassed by the claims.

Those skilled in the art may recognize other equivalents to the specific embodiment described herein which equivalents are intended to be encompassed by the claims attached hereto.

What is claimed is:

1. A method for generating an audio description of a Graphical User Interface (GUI) operating on a computer system, the method comprising:
activating a computer program, the computer program displaying a GUI on a monitor, the GUI comprising a plurality of objects, one of the plurality of objects being primed to receive input;
preparing a directed graph representation of the GUI, the directed graph representation defining a data structure including a node associated with each of the plurality of objects, an action verb associated with each node, an action object associated with each action verb, a transition associated with each action verb, and a consequence associated with each action verb;
parsing at least one string to contain words describing the primed object, the number of parsed strings being equal to a number of action verbs associated with the one of the nodes associated with the primed object, the parsing comprising:
concatenating and conjugating according to an order and rules of a human language grammar, the node associated with the primed object, the action verbs associated with the node associated with the primed object, and each of the action object, transition, and consequence associated with the action verbs; and
generating a text-to-voice formatted audio signal corresponding to a sequential expression of each parsed string;
wherein:
each string comprises a unique action verb;
each action verb comprises words of a human language description of an activity which may be performed by the corresponding primed object according to execution code logic of the computer program;
each action object comprises words of a human language description of a user input activity for the primed object addressed by the execution code logic;
each consequence comprises words of a human language description of a generated result in response to executing the action verb; and
each transition comprises words of a human language description of an object or GUI primed in response to executing the action verb.

2. The method of claim 1 wherein the user input activity includes striking keys on a keyboard.

3. The method of claim 1 further comprising receiving an input from a user in response to the generated audio signal.

4. The method of claim 1 further comprising:
receiving from a user, via a microphone, an idiosyncratic expression in response to the generated audio signal;
associating the idiosyncratic expression with an action verb; and
executing the generated result associated with the action verb;
wherein:
the idiosyncratic expression defines a response different from the action verbs and action objects explicitly listed in the directed graph but human understandable to correspond to with an action verb or action object explicitly listed in the directed graph.

5. The method of claim 4 wherein:
the microphone transmits the expression to speech-to-text software; and
the speech-to-text software converts the expression into a data format which can be processed by the execution code logic.

6. The method of claim 1 wherein the GUI comprises at least one object selected from the group consisting of checkboxes, radio buttons, drop down lists, combo boxes, list boxes, tree views, hotkeys, toggles, text fields, vertical slider bars, horizontal slider bars, progress bars, menu bars, tab sequences, group boxes and any combination thereof.

7. The method of claim 3 wherein in response to the receipt of the user input, changing the human language of the generated audio signal.

8. The method of claim 1 wherein the directed graph representation of the GUI is prepared prior to activating the computer program.

9. The method of claim 1 wherein the data structure is selected from the group consisting of list, array, associative array, multimap, set, bag, multiset, stack, queue, double ended queue, priority queue, tree, graph, and any combination thereof.

10. The method of claim 1 wherein the audio signal comprises a sound attribute selected from the group consisting of alternating tone, alternating tempo, musical notes, pauses between words, sound effects, and words absent from all of the nodes, action verbs, action objects, transitions and consequences.

* * * * *